March 19, 1968  C. G. A. JOHNSON ET AL  3,373,983
SEPARATOR PLATE

Filed Jan. 7, 1966  3 Sheets-Sheet 1

INVENTORS.
CARL G.A. JOHNSON
JAMES L. WHITTEN
BY
Watts & Fisher
ATTORNEYS

March 19, 1968 C. G. A. JOHNSON ET AL 3,373,983
SEPARATOR PLATE
Filed Jan. 7, 1966 3 Sheets-Sheet 2

INVENTORS.
CARL G.A. JOHNSON
JAMES L. WHITTEN
BY
*Watts & Fisher*
ATTORNEYS

INVENTORS.
CARL G. A. JOHNSON
JAMES L. WHITTEN
BY *Watts & Fisher*

ATTORNEYS

United States Patent Office 3,373,983
Patented Mar. 19, 1968

3,373,983
SEPARATOR PLATE
Carl G. A. Johnson, Rocky River, and James L. Whitten, Fairview Park, Ohio, assignors to The Alloy Engineering Company
Filed Jan. 7, 1966, Ser. No. 519,210
24 Claims. (Cl. 263—47)

ABSTRACT OF THE DISCLOSURE

A separator for supporting coiled strip in an annealing furnace including a support plate and a plurality of ribs secured to the plate to define fluid passages extending from the outer perimeter of the separator to a central opening.

---

The present invention relates to annealing and relates more specifically to separator plates which are placed between coils of strip metal stacked co-axially and in an annealing furnace.

The separator plates separate and space the coils of metal in a manner which permits the flow of the conditioning fluids between the stacked coils. Heat is provided to a protective inner cover around the stacked coils and heats the coils by radiation. Convection heating of the coils is accomplished by supplying and distributing a flow of blown heating fluid around and over the stacked coils. The conditioning fluid is caused to flow over the outside of the coils, through passageways provided by the separators, and then down through the cores of the coils.

The conditioning fluids, which may be heating and/or cooling gases in sweeping up the sides of the stacked coils between the muffle and the coils and moving through passageways formed by the separator plates, heat and/or cool the outer peripheral portions of the plates first and then the inner diameter portions. Having the outer portions of the plates heated or cooled prior to the inner portions creates stresses in the plates which oftentimes cause the plates to tear. In addition, the separator plates become heated or cooled prior to the stacked coils. The heated convector plates start an expensive movement which is restricted by the cooler stacked coils.

Many prior separator plates are unable to absorb this expansive movement internally and tend to warp and twist. Others tend to increase their thickness in order to absorb such expansion, thereby attempting to lift the stacked coils. In most separator plates, the expansion can be absorbed only by internal compression of the structural members of the plate excessively stressing the plate and causing damage to it.

The expansion and contraction that the plate undergoes during the thermal cycling (i.e., heating then cooling), causes stress concentrations to build up in critical areas of the separtaor palte. In addition, unless the separator palte is sufficiently strong and rigid, the plates will have a tendency to cave in between the supporting ribs. Other plates have a tendency to warp and twist and still others tend to tear radially starting at their outer perimeter portions.

Some prior separator plate constructions, although achieving sufficient strength and rigidity to prevent caving-in and warpage, do not permit an optimum gas flow through plate passages between the stacked coils. These plates are slower in heating the coils. The separator plates of the present invention have sufficient strength and rigidity to withstand warpage and caving-in aed provide an optimum gas flow through the passageways of the plate. In a separator plate of the present invention, at least one annular tie plate is provided for engagement with the stacked coils. Each such annular plate includes an inner surface defining a central fluid opening through it and an outer surface defining an outer perimeter of the separator plate. A plurality of ribs are connected to each tie plate and arranged in a generally radiating pattern relative to the center of each such plate. The ribs are divided into a plurality of sets of differing lengths depending on the separator plate diameter. The ribs of the second set are shorter than the ribs of the first set and the ribs of the third set of ribs are shorter than either the first or second and so forth with each set of ribs being shorter than the preceding sets of ribs having their inner ends terminating closer to the center of the separator plate.

The ribs of the first set are equally circumferentially spaced in the radiating pattern. The ribs of the second set are located between the ribs of the first set and are equally circumferentially spaced from each other and from the ribs of the first set. The ribs of the third set are located between the ribs of the first and second sets and are equally circumferentially spaced relative to each other and to the ribs of the first and second sets. The ribs of the first set extend substantially between the inner and outer surfaces of the tie plates. The ribs of the second set extend from the outer surfaces to points spaced from the inner surfaces and also spaced from the innermost ends of the ribs of the first set. The ribs of the third set extend from the outer surfaces of the plates to a point substantially spaced inwardly of the innermost ends of the ribs of the first and second sets.

The open spaces between the ribs at the outer perimeter of the separator plate are the inlets to passages extending through the plates between the ribs and are at least 50% of the space between the tie plates at the outer perimeter. The spaces between the ribs at the inner diameter of the tie plates are also at least 50% of the total space between the tie plates.

In the preferred separator plates, the ribs are standard size rectangular and square bars of a generally small unifom width relative to the height of the bars and relative to the spacing between bars. The arrangement of the bars is such that the passageways defined between them and the plates converge from the inlets at the perimeter of the separator plate to the outlets at the interior inner diameter of the plate which enhances the fluid through the plate. This separator plate does not, therefore, require the use of specially tapered bars.

In another separator plate of the present invention, a plurality of ribs are arranged in a spaced, radiating pattern. Tie plates extend across the spaces between the ribs and are affixed to the ribs to define a unitary separator plate structure. Inner ends of the ribs and the tie plates define a central opening in the separator plate and the outer ends of the ribs and the tie plates define an outer perimeter of the separator plate. The tie plates include longitudinally extending corrugated portions centered generally between the ribs and extending into the spaces between the ribs. The apexes of the corrugations are spaced inwardly of the surfaces of the ribs and/or tie plates which define the planes for engagement with the stacked coils.

In one form of the latter separator plate, the tie plates are connected to a common side of the ribs and define one plane of engagement. The ribs define the other plane of engagement. All of the corrugated portions extend into the spaces between the ribs toward the other side of the ribs which define the second plane of engagement.

In another form, the latter separator plate has the tie plates connected to opposite sides of the ribs and defining both planes of engagement. Every other tie plate is connected to the same rib sides and cover the entire surfaces of the rib sides. The corrugations of adjacent tie plates extend in opposite directions toward different planes of engagement and are spaced from their respective planes of engagement towards which they extend.

Still another separator plate form has ribs disposed on both sides of a tie plate. The outermost surfaces of the ribs define both planes of engagement. Corrugated portions of the tie plate member extend into the spaces between the ribs partially toward the planes of engagement.

In some forms of the present separator plate, the corrugated portions are a maximum depth at the outer peripheral portions of the separator plate and diminish gradually to a planar section at the innermost portions of the separator plates around the central opening. In these tie plates, apertures or other openings are provided in the tie plates near the innermost portions where necessary to provide passage from a valley defined by the corrugation into the central opening of the separator plate when the separator plate is in use between stacked coils.

In these separator plates having corrugations spaced from the planes of engagement, expansion and contraction is absorbed by movement of bent portions of the corrugation without warpage or twisting of the separator plate. This movement permits the ribs and tie plates to grow or shrink without changing the height or thickness of the separator plate and without internal stresses in the separator plate.

The present invention will be better understood by those skilled in the art from the following specification and the accompanying drawings in which.

Figure 1:
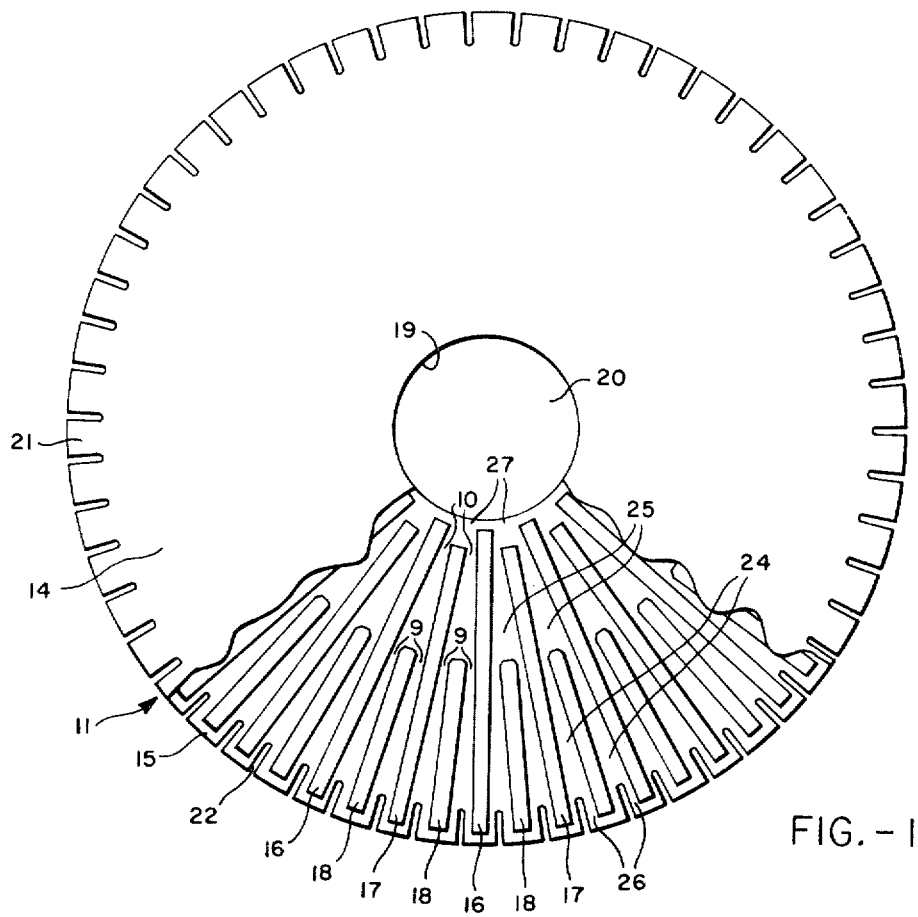
FIGURE 1 is a top plan view, with portions broken away, of a separator plate of the present invention.
Figure 2:
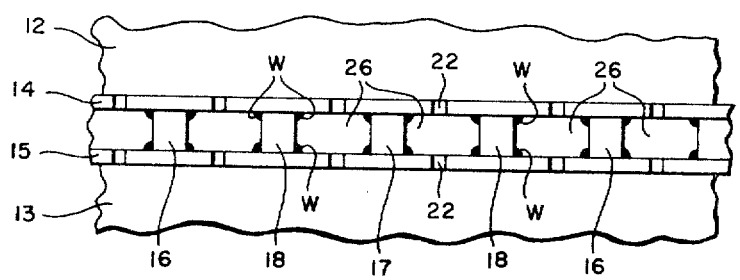
FIGURE 2 is an elevational view of the separator plate of FIGURE 1.

Referring now to the drawings and in particular, to FIGURES 1 and 2, a preferred separator plate is designated generally by the reference character 11. In FIGURE 2, the plate 11 is shown between two stacked coils 12, 13 of metal sheet material to space the coils 12, 13 and support the upper stacked coil 12 on the lower stacked coil 13.

The separator plate 11 comprises flat or planar tie plates 14, 15 and rib bars 16–18 sandwiched between the tie plates 14, 15. The tie plates are annular members having a circular inner surface 19 defining a central opening 20 in the separator plate 11 and an outer circular surface 21 defining an outer perimeter of the separator plate. As an example of one size of the separator plate of the present invention, the tie plates 14, 15 have an outer diameter of 72 inches and an inner diameter of 16 inches and are ⅜ inch thick.

The rib bars 16–18 are arranged in a spaced, generally radiating pattern between the tie plates 14, 15. The bars 16–18 are all elongated solid bars of a mild steel or other suitable material. The rib bars 16 are every fourth rib and extend substantially between the circular surfaces 19, 21 and have their ends spaced slightly inward of the surfaces 19, 21.

The ribs bars 17 are shorter than the rib bars 16 and are circumferentially spaced exactly intermediate between the rib bars 16. The rib bars 17 extend fom near the outer circular surfaces 21 to points substantially spaced from the inner circular surfaces 19 and are spaced from the inner ends of the bars 16.

The ribs bears 18 are twice in number as the rib bars 16 or 17 and comprise every other rib of the radiating pattern of the ribs. The rib bars 18 are generally one-half the length of the rib bars 17 and extend from near the outer circular surface 21 of the separator plate to approximately midway of the rib bars 17. The rib bars 18 provide a substantial portion of the support between the tie plates 14, 15. As shown, the outer ends of all of the rib bars 16–18 are spaced slightly inward radially from the outer circular surfaces 21 defining the outer perimeter of the separator plate 11. The rib bars 16–18 have their longitudinal center lines extending along equal-angularly spaced radii of the separator plate 11. The tie plates 14, 15 are each slotted at 22 intermediate between the ribs bars 16–18. The slots 22 extend from the outer peripheries of the plates 14, 15 to well within the rib bars 16–18. The slots permit expansion and contraction of the peripheral portions of the plates 14, 15 and substantially reduce their tendency to tear. The rib bars 16–18 are affixed to the plates 14, 15, for example, by spaced typical welds W.

In the separator plate given as an example herein, the separator bars 16 are one inch square bars by 27¼ inches in length. The bars 17 are one inch square bars by 24 inches in length. The bars 18 are one inch square bars by 15⅜ inches in length. The outer ends of the bars are all spaced three-eights of an inch from the outer circular surface 21 of the separator plate 11. The inner ends of the bars 16 also are spaced ⅜ of an inch from the inner circular surface 19 of the separator plate. The slots 22 are each ⅜ inch wide by two inches long.

The rib bars 16–18 and the tie plates 14, 15 define fluid pasageways 24, 25 having inlets 26 at the outer perimeter of the separator plate 11 and converging into main outlet orifices 27 at the central fluid opening 20. The passageways 24 defined between the ribs 18 of the third set and the adjacent ribs 16, 17 of the first and second sets converge into the passageways 25 defined between the ribs 16, 17 of the first and second sets. The latter passageway in turn converge to the main outlet orifices 27 between the ribs 16 of the first set. The innermost ends of the ribs 18 of the third set are chamfered on their corners to increase the orifice between the ribs 16–18 at this point and to reduce turbulence.

In the size separator plate given as an example herein, there are two inch open spaces between the ribs 16–18 at the inlets 26. The rectangular orifice spaces 9 between the chamfered corners of the rib bars 18 and the adjacent bars 16, 17 which provide communication between the passageways 24, 25 are three quarter inch wide each, so that the orifices 9 are limiting orifices relative to the inlets 26. The lateral orifice spaces 10 between the inner ends of the rib bars 17 and the sides of the adjacent rib bars 16 are one inch wide each so that the orifices 10 defined at this point are smaller and more limiting than the preceding orifices 9 connecting the passageways 24 to the passageways 25. Finally, the outlet orifices 27 between the corners of the rib bars 16 are one end seven eights inches wide each so that the outlet orifices 27 are each smaller than the combined spaces of each pair of orifices 10 ahead of it. The outlet orifices 27 are, therefore, the most limiting orifices for the fluid flowing through the passageways 24, 25 and the orifices 9, 10.

In the preferred separator plate 11, there is at least 50% open passageway space between the ribs 16 at the innner diameter of the separator plate 11 to provide optimum gas flow through the plate 11. In other words, the 1⅞ inch spaces between the ends of the ribs 16 together are more than equal to the one inch widths of the ends of the bars 16 taken together. The 50% open passageway space is also provided between the ends of the bars 17 and the adjacent side surfaces of the bars 16 at the orifices 10. The one inch bars 16, 17 are exactly equal in width to the orifices 10 so that the orifice spaces are exactly 50% of the total space along an imaginary circle at these points on the separator plate 11. The spacing and arrangement of the uniformly small bars 16–18 as shown enhance maximum gas flow through the separator plate passageways and orifices with nearly one half of the surfaces of the tie plates 14, 15 being supported by the ribs 16–18.

In the preferred separator plate shown, a ratio of 5.33 to 1 of the space between any two adjacent ribs at the inlets 26 and the thickness of either of the plates 14, 15 is used and provides sufficient support to prevent the plates 14, 15 from caving in between the ribs 16–18. It is preferred that the latter ratio does not exceed generally 6 to 1.

Although square bars are shown in the preferred separator plate 11, the spacing ratios and percentages can also be accomplished by the use of rectangular bars provided the bars are of generally uniform, small cross-section and the above-described six to one ratio is maintained. For example, in another separator plate one inch by one and a half inches rectangular bars are utilized for the rib bars 18. In any event, the width of the bars at the inlets 26 should be substantially less than the spaces between the bars at the inlets 26 to provide large openings for the inlets 26 and still maintain the six to one ratio. Also, the width of the bars should be at least one-half of the height of the bars which is one-half of the space between the tie plates 14, 15 in order to maintain good bar stability.

Figure 3:
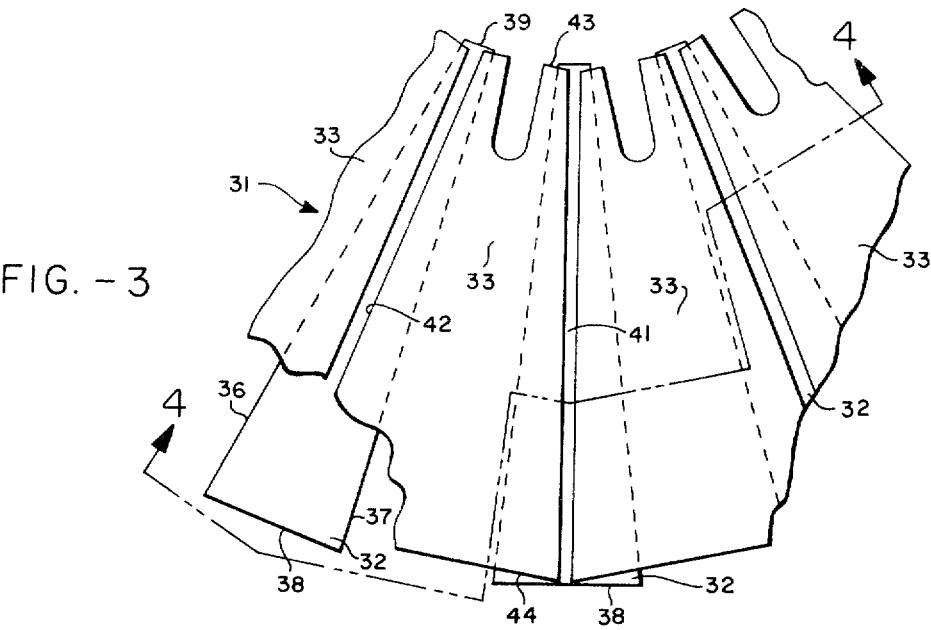
FIGURE 3 is a fragmentary top plan view of another separator plate of the present invention.
Figure 4:
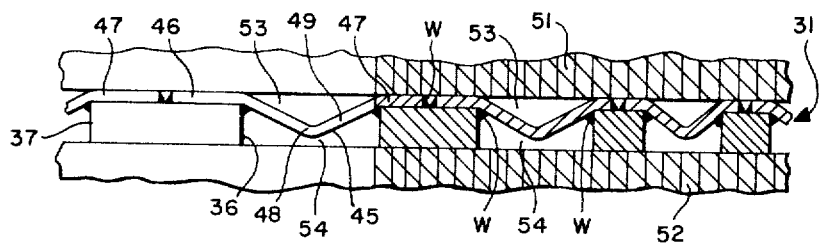
FIGURE 4 is an elevational view, in cross section, of the separator plate of FIGURE 3.
Figure 5:
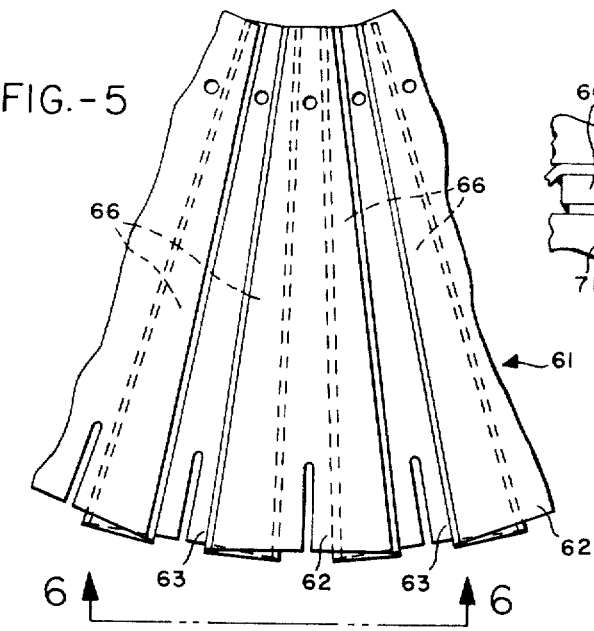
FIGURE 5 is a fragmentary top plan view of still another embodiment of the invention.

Another separator plate embodiment is designated generally by the reference character 31 in FIGURES 3–5. The separator plate 31 is generally circular and comprises a plurality of wedge-shaped rib bars 32 and a plurality of tie plates 33.

The rib bars 32 preferably are heavy, solid, identical bars having parallel upper and lower surfaces 34, 35 and converging side surfaces 36, 37 which taper mutually inward from a large outer end 38 to a smaller inner end 39. The rib bars 32 extend radially outward along radii of the separator plate 31 and are equally angularly spaced circumferentially. The inside small ends of the rib bars 32 are equally spaced radially from the center of the separator plate 31 to partially define an inner, generally circular central port opening having its center at the center of the separtor plate 31.

The tie plates 33 are preferably heavy steel sheet material and are also wedge-shaped. Side edges 41, 42 of each tie plate 33 converge inwardly from an outer end 44 to an inner end 43. The longitudinally extending, central portions of the tie plates 33 are bent to form a longitudinal corrugation 45 extending between the inner and outer plate ends 43, 44 and are centered between planar connection portions 46, 47 resting on the rib bars 32. The corrugation 45 and the connection portions 46, 47 are wedge-shaped portions in the same manner as the rib bars 32 so that the outer edges of the tie plates diminish in size toward the inner end of the plate. The corrugation 45 in each tie plate 33 is somewhat V-shaped and has a constant depth throughout its entire longitudinal extent. The angle between half portions 48, 49 of the V-shaped corrugation 45 decreases toward the smaller end dimension of the tie plate 31. As the angle between the half portions 48, 49 of the corrugation 45 decreases, the stresses in the apex portion of the corrugation tend to increase. A U-shaped slot 50 is provided at the inner and smaller ends 43 of each of the tie plates 33 along the valley of the corrugation 45. The slots 50 avoid the sharp corrugation which would occur at the inner ends of the tie plates 33 and relieves the stress in the apex of the corrugation 45 particularly during forming of the corrugation.

The tie plates 33 are arranged in circumferentially spaced relation with their planar connection portions 46, 47 resting on the upper surfaces of adjacent rib bars 32 and their corrugations 45 projecting toward the opposite lower surfaces of the rib bars 32 and down into the spaces between the rib bars 32. The tie plates 33 are fixed to the rib bars 32 preferably by the welds W. Adjacent edges of adjacent tie plates are spaced as shown. The apex or lowermost surface of the corrugations 45 are spaced inwardly or upwardly of a support plane defined by the lowermost or awaymost surfaces of the ribs. The spacing between the latter support plane and the closest surface of the corrugation 45 is preferably one-fourth of the height of the rib bars 32.

The side half portions 48, 49 of the V-shaped corrugations are also wedge shaped and taper from their largest ends near the outer diameter of the separator plate 31 to smaller inner ends at the inner diameter of the separator plate so that the distance across the valleys defined by the corrugated portions of the plates diminishes toward the inner diameter of the plate 31.

The innermost ends of the tie plates 33 and the rib bars 32 together define a central opening or port at the inner diameter of the plate 31 similarly to the separator plate 11. The U-shaped slots 50 at the inner ends of the plate 31 increase the effective orifice size of this central opening to permit greater fluid flow through the center of the plate.

While the separator plate embodiment shown in FIGURES 3, 4 utilizes a plurality of tie plates each individually formed as shown, it to be recognized that the rib bars 32 can be tied or connected together by a one-piece circular tie plate with the corrugations stamped or formed individually starting at one end of the plate. The single piece tie plate can be made from a single piece plate which is initially "C" shaped and closes to a circle as the corrugations are stamped in the plate.

Referring to FIGURE 4, the separator plate 31 is shown between two coils of sheet metal 51, 52. The exposed surfaces of the coils 51, 52, the surfaces of the corrugated portion of the tie plates 33 and the adjacent surfaces of the rib bars 32 define fluid, upper and lower passageways extending from the outside perimeter of the separator plates 31 to a central opening. The passageway space between the adjacent rib bars 32 at the outer perimeter of the separator plate 31 is preferably equal to the width of the rib bars. The space between the rib bars at the central port opening is approximately twice the width of the inner ends of the rib bars at the central opening. The upper passageway 53 formed by the valley of the corrugation 45 diminishes towards the inner ends or central opening of the separator plate 31. The U-shaped slot 50 at the inner ends of the corrugation 45 increases the outlet end space of the air passageway at the inner end of the tie plate 31.

With the corrugations 45 between the connected portions 46, 47 of the tie plates 33 extending only partially into the space between the rib bars 32, there is room for expansion and contraction of the plates 33 toward and away from the opposite surfaces of the rib bars. The corrugations 45 and their movability in the spaces between the rib bars 32 relieve internal stresses which build up in the plate 31 during thermal cycling of the plate and thereby eliminate tearing of the tie plates 33.

In addition, the corrugations 45 and the expansion space permit the plate 31 to expand or contract without twisting or warping of the plate 31 and without trying to lift the above stacked coils. The corrugations 45 extending into the space between the rib bars 32 further permit permanent growth or shrinkage of the plate as often results from thermal cycling.

Figure 6:
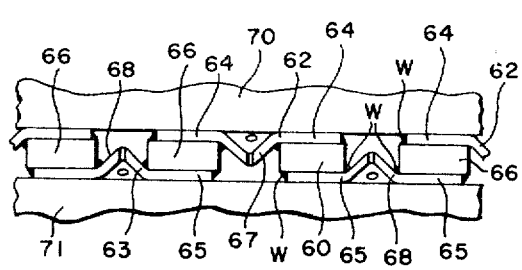
FIGURE 6 is an elevational view taken on the line 6—6 of FIG. 5.

Referring to FIGURES 5, 6, another separator plate embodiment of the type described in U.S. Patent 2,981,530 to P. S. Menough is designated generally by the reference character 61. The separator plate 61 has a plurality of tie plates 62 arranged in a radially spaced pattern in an upper section to define an upper support plane. A second group of radially spaced plates 63 in a similar pattern form a lower section to define a lower support plane. The plates 62, 63 are wedge-shaped and taper inwardly from their outer ends 64 toward their inner ends 65. The plates 62, 63 of the upper and lower sections are superimposed and indexed with respect to each other such that each plate of one section is aligned with a space between the plates of the other section. Connection portions 64 of the plates 62 of the upper section are vertically superimposed with respect to connection portions 65 of the plate 63 of the lower section.

A plurality of radial support rib bars 66 interconnect each pair of aligned plate connection portions 64, 65. The rib bars 66 are spaced from each other in a radial pattern and extend from the inner ends of the plates 62, 63 to their outer ends. The plates 62, 63 are fixed to the ribs as by welds W. The plates 62, 63 include corrugations 67, 68 respectively extending into the spaces between the rib bars. The apexes of the corrugations of the tie plates of one section are spaced inwardly of the support plane defined by the tie plates of the other section.

The valley defined by the corrugation of each tie plate s a maximum at the outer diameter of the separator plate 61 and diminishes to a planar area at the inner ends of the tie plates. An aperture 69 is provided at the inner end of the valley wall of each tie plate to open the fluid passageway defined by the valley to the central opening of the separator plate 61. The aperture avoids the creation of static spaces between stacked coils 70, 71 and the V-shaped passages defined by the corrugated plates 62, 63.

Figure 7:
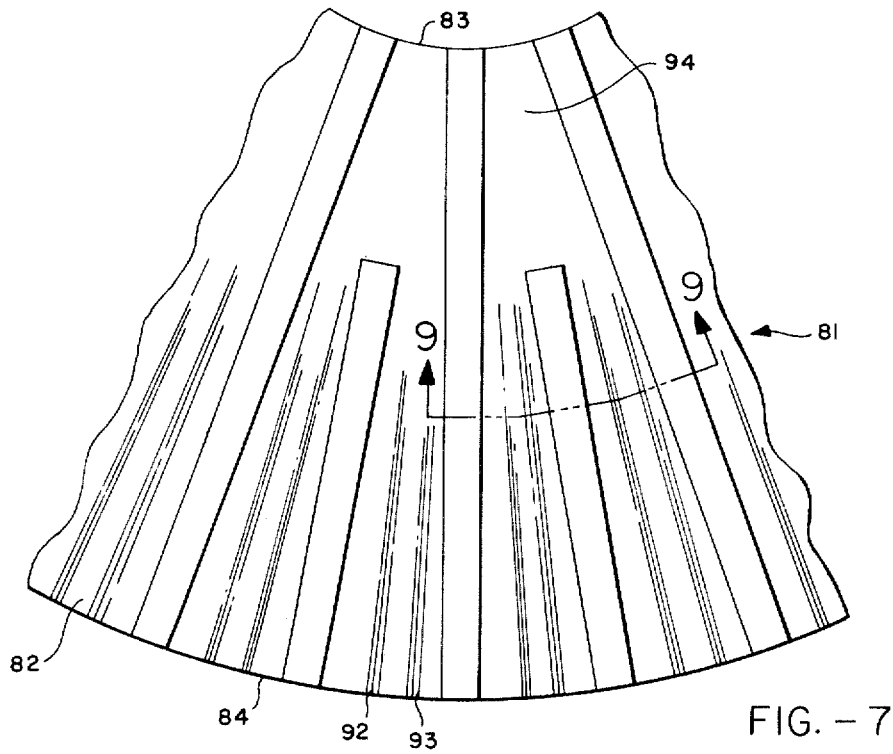
FIGURE 7 is a fragmentary, top plan view of still another embodiment of the invention.
Figure 8:
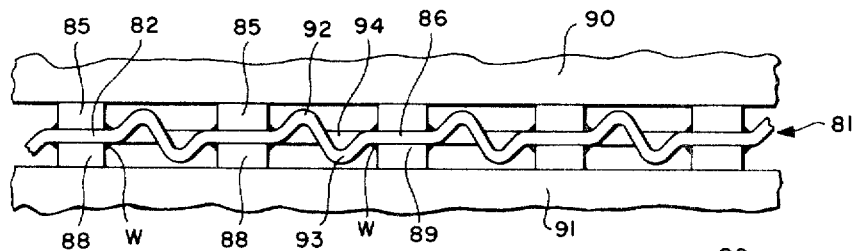
FIGURE 8 is an elevational view of the embodiment shown in FIG. 7.
Figure 9:
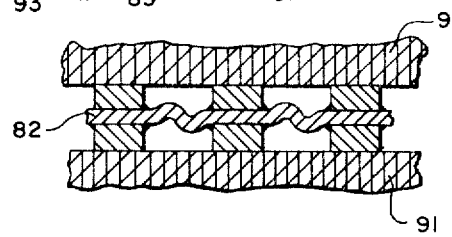
FIGURE 9 is a cross-sectional view taken on the line 9—9 of FIG. 7.

Referring to FIGURES 7–9, still another separator plate embodiment is designated generally by the reference character 81. The separator plate 81 includes an annular single piece tie plate 82 having an inner diameter surface 83 defining a central opening and an outer diameter surface 84 defining the outer perimeter of the plate.

An upper or first section of radial, wedge-shaped ribs 85 are distributed in a radiating spaced pattern on an upper surface 86 of the tie plate 82. A lower or second section of radial, wedge-shaped ribs 88 are distributed in a radiating pattern along a lower surface 89 of the tie plate 82. The rib bars 85 of the upper section are immediately superimposed on the rib bars 88 of the second or lower section. One half of the rib bars 85, 88 extend substantially fully between the inner and outer diameters of the plate 82. The remaining rib bars are between the first bars and terminate spaced from the inner diameter or central opening of the tie plate 82. The spaces between the tie plate 82 and the rib bars 85, 88 form air passageways with exposed surfaces of upper and lower stacked coils 90, 91 respectively.

The portions of the tie plate 82 in the spaces between the rib bars 85, 88 include oppositely extending corrugations 92, 93. The corrugations 92 extend into the spaces between the rib bars 85 of the first section. The corrugations 93 extend into the spaces between the rib bars 88 of the second section. The apexes or the outermost surfaces of the corrugations 92, 93 are spaced inwardly of the support plane defined by the rib bars between which they extend. The corrugations 92, 93 have a maximum offset at the outer diameter of the plate and taper or diminish gradually to a planar or flat surfaced annular portion 94 centrally of the tie plate 82.

The corrugations in the outer portions of the tie plate 82 permit expansion and contraction of the separator plate 81 without warpage. The inner or central planar or flat portions of the tie plate 82 give sufficient rigidity to the separator plate 81 to limit growth or shrinkage of the plate and thereby maintain its size.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A separator for spacing stacked coiled workpieces to be heat treated, said separator comprising:
   (a) a support plate having an inner surface defining a fluid opening through the center of the separator and an outer surface defining an outer perimeter of the separator;
   (b) a plurality of ribs connected to the plate and arranged in a generally radiating pattern relative to the center of the plate;
   (c) a first set of said ribs being equally spaced circumferentially and extending for substantially the radial dimension of the plate between the inner and outer surfaces;
   (d) a second set of said ribs being equally spaced circumferentially, each of said second set of ribs being located between two ribs of said first set and extending from substantailly the outer surface of the plate to a location spaced outwardly from the inner ends of said first set of ribs;
   (e) a third set of said ribs being located between adjacent ribs of said first and second sets, said third set of ribs being shorter in length than the ribs of said first and second sets and extending from adjacent the outer surface of said plate to locations spaced outwardly from the inner ends of said second set of ribs;
   (f) said ribs defining fluid passages converging toward said fluid opening; and
   (g) the ratio of the space in said passageways between said ribs at the outer perimeter of the separator to the thickness of the plate being generally no more than 6 to 1.

2. A separator as claimed in claim 1 including another plate, said ribs being sandwiched between said first-mentioned plate and said another plate.

3. The separator of claim 1 wherein the ribs of the third set are generally slightly more than one-half the length of the ribs in the first set.

4. The separator of claim 1 wherein orifice spaces in the passageways between an innermost end of the ribs of the second set and adjacent ribs of the first set are more limiting than the orifice spaces between the inner ends of the ribs of the third set and the adjacent ribs of the first and second sets.

5. The separator of claim 4 wherein the orifice spaces between the inner ends of the ribs of the second set and adjacent ribs of the first set are more limiting than the orifice spaces between the inner ends of the ribs of the third set and the adjacent ribs of the first and second sets, and the orifice spaces between the inner ends of the ribs of the first set are more limiting than the orifice spaces between the inner ends of the ribs of the second set and the adjacent ribs of the first set.

6. A separator for spacing stacked coiled workpieces to be heat treated, said separator comprising:
   (a) a metal support plate having an inner surface defining a fluid opening through a center of the separator and an outer surface definnig an outer perimeter of the separator;
   (b) a plurality of metal ribs having straight sides welded to said support plate and arranged around said opening;
   (c) said ribs being elongated bars of generally uniform cross sectional area and defining fluid passages converging toward said fluid opening;
   (d) the width of each of said ribs being at least one-half of its height and the width of the outer ends of said ribs being substantiailly less than the spacing between the ribs at their outer ends;
   (e) the ratio of the space in said passageway between said ribs at the outer perimeter of the separator to the thickness of the plate being generally no more than six to one; and (f) the outer portions of said plate adjacent said outer surface being slotted from the outer surface toward said inner surface between said ribs.

7. A coil separator for spacing stacked workpieces to be heat treated, said separator comprising:
   (a) a tie plate member defining a central opening through said separator;
   (b) a plurality of spaced rib members having straight sides welded to said tie plate mmeber around said opening, said rib members being arranged to define fluid passages which converge inwardly from the outer perimeter of said tie plate member toward said opening;
   (c) said members having surfaces defining spaced planes for engagement with the stacked workpieces to be treated;
   (d) portions of each such plate member between each pair of adjacent rib members including corrugated portions extending inwardly from the outer perimeter of said tie plate member into the spaces between said rib members; and,
   (e) said corrugated portions being spaced inwardly of the surfaces defining the planes of engagement whereby expansive and contractive movement of the ribs and plate members is accommodated by the corrugated portions.

8. The separator of claim 7 wherein said tie plate member defines one of the planes of engagement and said rib members define the other plane of engagement.

9. The separator of claim 7 wherein surfaces of all such tie plate mmebers define at least parts of both planes of engagement.

10. The separator of claim 7 wherein the outermost surfaces of an apex of corrugation in each corrugated portion is spaced from the opposite plane for engagement at least one-fourth of the height of the rib members connected to the tie plate member.

11. The separator of claim 7 wherein portions of the tie plate member between the ribs at the innermost parts of the separator are slotted at the corrugation.

12. The separator of claim 7 wherein each corrugated portion of the tie plate member is generally centrally located between the ribs and the degree of corrugation diminishes gradually to a planar surface at the innermost parts of the tie plate member.

13. The separator of claim 7 wherein each such tie plate member is on a common side of all of the ribs to define one of said planes for engagement.

14. The separator of claim 7 wherein said rib members are disposed on both sides of said tie plate member and define both planes of engagement.

15. A separator for spacing stacked coiled workpieces to be heat treated, said separator comprising:
   (a) a support plate having an inner surface defining a fluid opening through the center of the separator and an outer surface defining an outer perimeter of the separator;
   (b) a plurality of ribs connected to the plate and arranged around said opening;
   (c) a first set of said ribs being equally spaced circumferentially and extending for substantially the radial dimension of the plate between the inner and outer surfaces;
   (d) a second set of said ribs being equally spaced circumferentially, each of said second set of ribs being located between two ribs of said first set and extending from substantially the outer surface of the plate to a location spaced outwardly from the inner ends of said first set of ribs;
   (e) a third set of said ribs being located between adjacent ribs of said first and second sets, said third set of ribs being shorter in length than the ribs of said first and second sets and extending from adjacent the outer surface of said plate to locations spaced outward from the inner ends of said second set of ribs; and
   (f) said ribs defining fluid passages converging toward said fluid opening.

16. A separator comprising metal plate structure, said plate structure defining a central opening through said separator, a plurality of spaced ribs welded to said plate structure around said opening, said ribs having straight sides and being arranged to define fluid passages which converge inwardly from the outer perimeter of said plate structure toward said opening, and said plate structure having stress-relieving portions between each pair of adjacent ribs for preventing distortion of said plate structure by thermal cycling, said stress-relieving portions extending inwardly from the outer perimeter of said plate structure.

17. A separator as claimed in claim 16 wherein said stress-relieving portions are at least partially defined by corrugations in said plate structure.

18. A separator as claimed in claim 17 wherein said plate structure is comprised of segments welded to a common side of all of said ribs.

19. A separator as claimed in claim 17 wherein said plate structure is comprised of segments, and wherein adjacent segments are welded to opposite sides of said ribs.

20. A separator as claimed in claim 17 wherein said plate structure is defined by a single unitary member.

21. A separator as claimed in claim 17 wherein said stress-relieving portions further include slots in the corrugations of said plate structure.

22. A separator as claimed in claim 16 wherein said stress-relieving portions are at least partially defined by slots in said plate structure.

23. A separator as claimed in claim 22 wherein said plate structure is defined by a single unitary member.

24. A separator as claimed in claim 22 wherein a first set of said ribs are equally spaced circumferentially of said plate structure; wherein a second set of said ribs are equally spaced circumferentially of said plate structure and are shorter than the ribs of said first set, each of the ribs of said second set being disposed between two ribs of said first set; and wherein a third set of said ribs are located between adjacent ribs of said first and second sets, said third set of ribs being shorter than said second set of ribs.

References Cited

UNITED STATES PATENTS

| 2,489,012 | 11/1949 | Dailey | 263—47 |
| 2,600,094 | 6/1952 | Cone | 263—40 |
| 2,998,967 | 9/1961 | Dailey et al. | 263—47 |
| 3,082,996 | 3/1963 | Elrick et al. | 263—40 X |
| 3,100,634 | 8/1963 | Rubrecht et al. | 263—40 X |
| 3,145,982 | 8/1964 | Ludwig | 263—47 |

FREDERICK L. MATTESON, Jr., *Primary Examiner.*

JOHN J. CAMBY, *Examiner.*

UNITED STATES PATENT OFFICE
CERTIFICATE OF CORRECTION

Patent No. 3,373,983                      March 19, 1968

Carl G. A. Johnson et al.

It is hereby certified that error appears in the above numbered patent requiring correction and that the said Letters Patent should read as corrected below.

Column 1, line 43, "expensive" should read -- expansive --; line 56, "separtaor palte" should read -- separator plate --; line 57, "palte" should read -- plate --; line 68, "aed" should read -- and --. Column 2, line 44, after "fluid" insert -- flow --. Column 3, line 74, "fom" should read -- from --. Column 4, line 3, "bears" should read -- bars --; line 35, "pasageways" should read -- passageways --; line 42, "passageway" should read -- passageways --; line 60, "end" should read -- and --; line 61, "eights" should read -- eighths --. Column 5, line 45, "sepaartor" should read -- separator --. Column 6, line 28, "it" should read -- it is --. Column 7, line 22, "s" should read -- is --. Column 8, line 72, "substantailly" should read -- substantially --. Column 9, line 11, "mmeber" should read -- member --; line 33, "mmebers" should read -- members --; line 34, "plates" should read -- planes --.

Signed and sealed this 12th day of August 1969.

(SEAL)
Attest:

EDWARD M. FLETCHER, JR.                      WILLIAM E. SCHUYLER, JR.
Attesting Officer                              Commissioner of Patents